United States Patent [19]

Alber et al.

[11] Patent Number: 5,791,194
[45] Date of Patent: Aug. 11, 1998

[54] SHIFT DEVICE FOR A MOTOR VEHICLE GEAR CHANGE TRANSMISSION

[75] Inventors: Heinz Alber, Leinfelden-Echterdingen; Hartmut Nied, Waiblingen; Guenter Woerner, Kernen, all of Germany

[73] Assignee: Mercedes-Benz AG, Germany

[21] Appl. No.: 767,255

[22] Filed: Dec. 13, 1996

[30] Foreign Application Priority Data

Dec. 13, 1995 [DE] Germany ................ 195 46 547.4

[51] Int. Cl.[6] ............................................... F16H 63/20
[52] U.S. Cl. ................................................... 74/473 R
[58] Field of Search ........................................ 74/473 R

[56] References Cited

U.S. PATENT DOCUMENTS 4,307,623  12/1981  Cavallero et al. .............. 74/473 R
5,321,993  6/1994  Herzog et al. .................. 74/473 R

FOREIGN PATENT DOCUMENTS

4443523C1  2/1996  Germany.

Primary Examiner—Rodney H. Bonck
Assistant Examiner—Troy Grabow
Attorney, Agent, or Firm—Evenson, McKeown, Edwards & Lenahan, P.L.L.C.

[57] ABSTRACT

A shift device for the gear change transmission of a motor vehicle has a jib supporting an additional mass pivotably on a housing part. The jib is connected by a link to a shift lever which is connected in a rotationally fixed manner to a rotatably and axially displaceable selector shaft. The shift lever can be actuated by a manual shift lever via a kinematic connection.

7 Claims, 3 Drawing Sheets

SHIFT DEVICE FOR A MOTOR VEHICLE GEAR CHANGE TRANSMISSION

BACKGROUND AND SUMMARY OF THE INVENTION

The present invention relates to a shift device, and more particularly, to a shift device comprising a selector shaft arranged rotatably and axially displaceably in a gear-shift housing and having a shift lever rotationally fixed relative to the said selector shaft and kinematically connected to a manual shift lever. An additional mass acts on the shift lever and increases a mass moment of inertia of the selector shaft such that force peaks of shift force measurable on the manual shift lever are reduced during individual gear-shift operations. The additional mass is connected to the selector shaft and is arranged on a jib mounted pivotably on a housing part of the gear-shift housing at a distance from a rotation axis of the selector shaft. The jib is transmission-connected to the shift lever and a pivot-bearing axis of the jib being parallel to the rotation axis of the selector shaft. The additional mass is arranged at a distance from the pivot axis greater than a transmission connection between the jib and shift lever and so that only the engagement movement is transmitted to the additional mass.

A previously unpublished German patent application No. 195 23 141.4-12 describes a shift device for a motor vehicle gear change transmission. A selector shaft is arranged rotatably and axially displaceably in a gear-shift housing and has a shift lever which is rotationally fixed relative to the said selector shaft and which is kinematically connected to a manual shift lever. An additional mass acts on the shift lever and increases the mass moment of inertia of the selector shaft such that force peaks of the shift force measurable on the manual shift lever are reduced during individual gear-shift operations. In this prior shift device, the additional mass is connected to the selector shaft, and the additional mass is arranged so that only the engagement movement is transmitted thereto.

This prior arrangement has a disadvantage because the selector shaft was loaded to a greater or lesser extent by the weight of the additional mass. Thereby, the selector-shaft movements in the directions of the selector-shaft axis for selecting the gear-shift slots were adversely influenced by the occurring mass effect. Consequently, an attempt was made to avoid the occurrence of mass effects which adversely influence the selection of the gear-shift slots essentially by arranging the additional mass on a jib which is mounted pivotably on a housing part of the gear-shift housing at a distance from the axis of rotation of the selector shaft and which was transmission-connected to the shift lever. The pivot-bearing axis of the jib was parallel to the rotation axis of the selector shaft.

An object of present invention is to avoid the occurrence of mass effects which adversely influence the selection of the gear-shift slots.

According to the present invention, this object has been achieved by articulating a link at one end on the shift lever and at its other end on the jib.

In the shift device according to the present invention, the additional mass is mounted pivotably and is transmission-connected to the shift lever of the selector shaft. Consequently, a high dynamic effect in respect of the reduction of the shift force is achieved with minimal use of a mass.

Moreover, the mechanical coupling of the jib to the shift lever of the selector shaft via a link having a play-free connection at the two points of articulation and virtually friction-free force transmission during the active gear-shift cycles according to the present invention has proved to be advantageous.

Further, the use of ball joints in the present invention affords a degree of freedom in all directions of movement during coupling.

In the shift device according to the present invention, the shift lever and jib are actuated in the same rotational direction about their respective pivot axis or axis of rotation. A further lever step-up for increasing the pivot angle of the additional mass is also afforded by the configuration of the present invention.

The insertion of the link in the transmission advantageously ensures that there are no adverse effects on the profile of the manual force exerted during the selection of the gear-shift slots.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
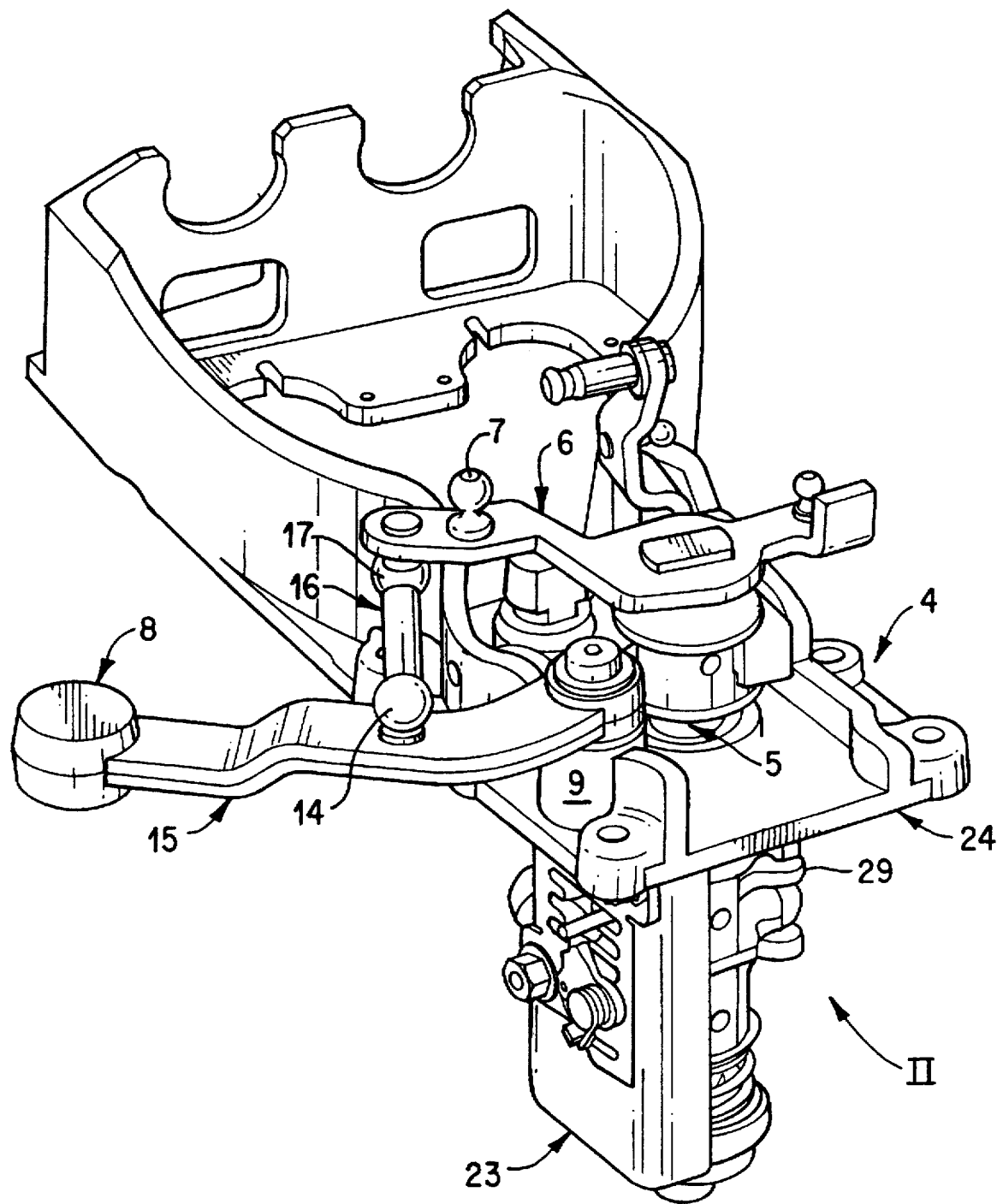
FIG. 1 is a perspective view of the shift device according to the present invention.
Figure 2:
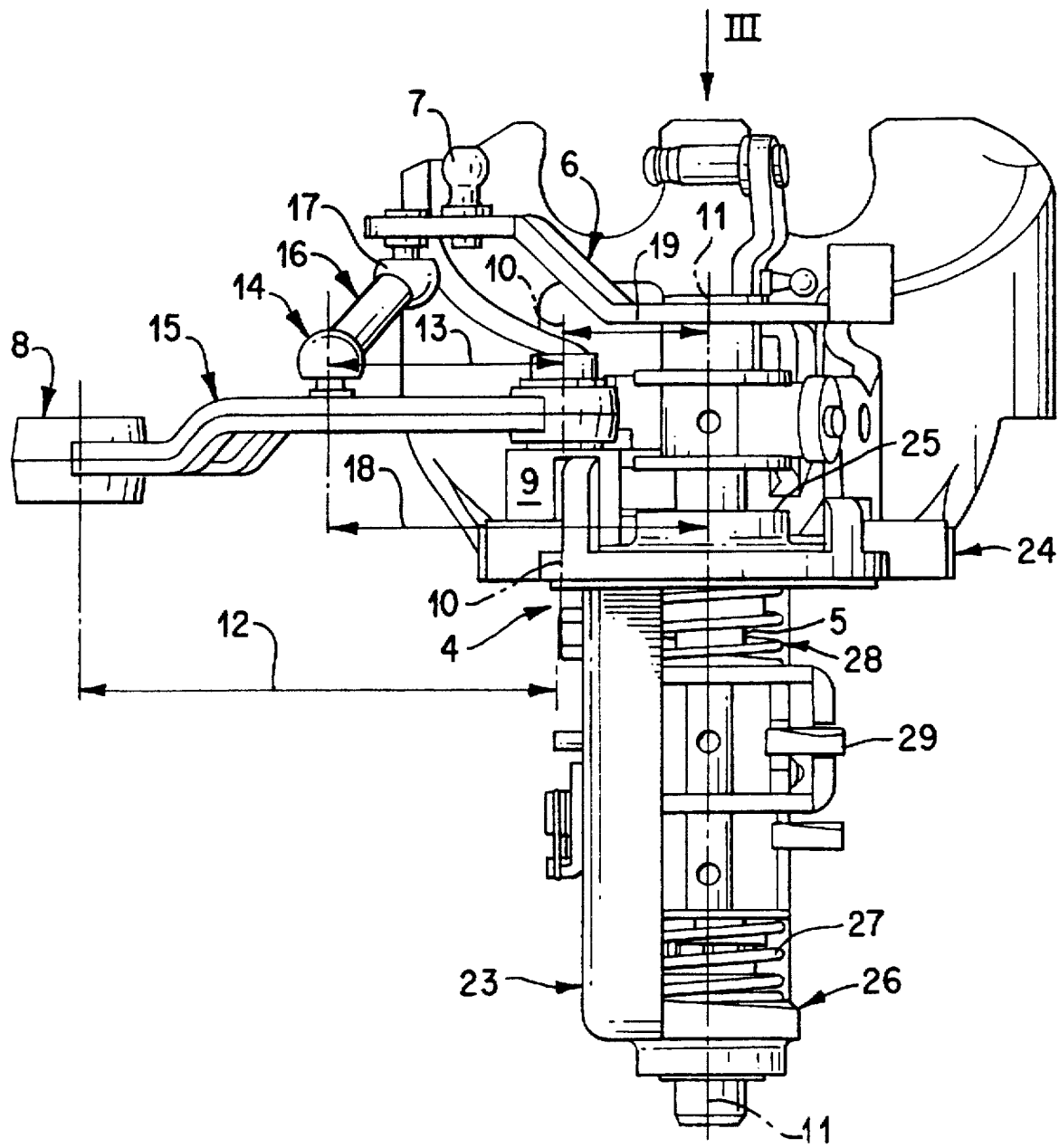
FIG. 2 is a view of the shift device along arrow II in FIG. 1.
Figure 3:
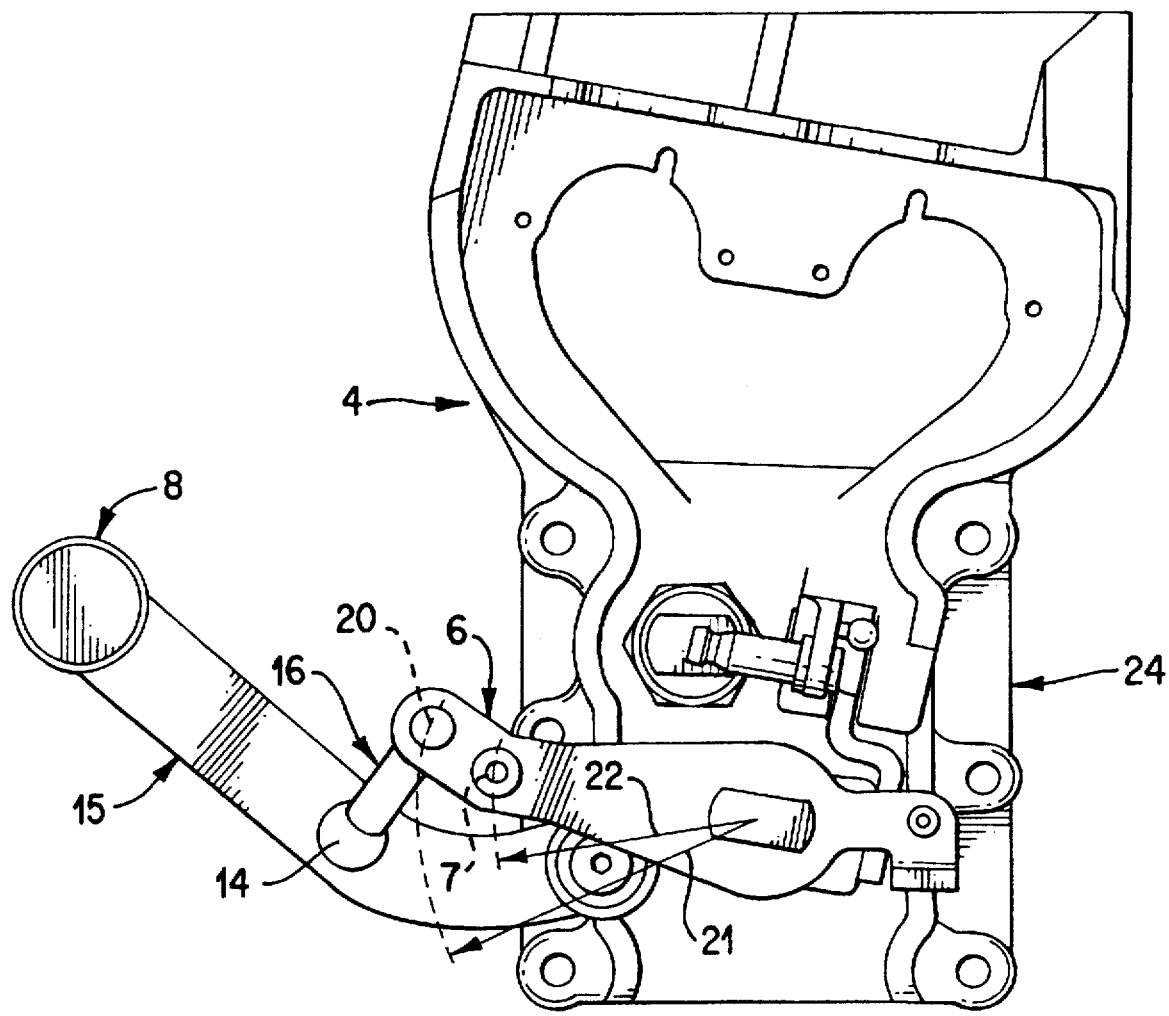
FIG. 3 is a top view of the shift device of FIG. 1 along arrow III of FIG. 2.

A gear-shift housing 4 having an essentially vertical arrangement is inserted into an orifice of a transmission housing of a gear change transmission. The gear-shift housing 4 projects with a gear-shift console 23 into the transmission housing, the associated housing orifice of which is closed by a closing flange 24 of the gear-shift housing 4. A selector shaft 5 with its axis of rotation 11—11 (FIG. 2) oriented vertically is mounted rotatably and axially displaceably relative to the gear-shift housing 4 by an upper bearing arrangement 25 in the closing flange 24 and a lower bearing arrangement 26 of the gear-shift console 23. The selector shaft 5 can be fixed in the illustrated neutral position in the directions of the rotation axis 11—11 by a lower centering-spring arrangement 27 on the gear-shift console 23 and by an upper centering-spring arrangement 28 on the closing flange 24.

A cable pull connected kinematically at one end to a manual shift lever is connected at its other end by a joint pin 7 to a shift lever 6 which, in turn, is fixedly connected via its hub to the upper shaft end of the selector shaft 5. The upper shaft end passes outwards through the bearing arrangement 25. When the cable pull is actuated, a shift finger 29 of the selector shaft 5 is pivoted in the customary way in order to actuate a shift clutch for coupling a loose wheel to its shaft, i.e., to select or disengage a gear.

Further details of the shift device are found in DE 44 43 523 C1 and in co-pending application Ser. No. 08/568,573 filed Dec. 7, 1995 as regards the shift functions.

The closing flange 24 is provided on its top side with a rest 9, on which a jib 15 is supported vertically and is mounted pivotably about a pivot axis 10—10 parallel to the rotation axis 11—11. The free end of the jib 15 carries an additional mass 8 for smoothing the manual-force profile during the shifting of the gears, that is to say, essentially during the engagement of the respective gear. The shift lever 6 is transmission-connected to the jib 15 by a link 16, with a ball joint 17 or 14 being interposed in each case. To increase the pivot angle of the additional mass 8, on one hand, the arrangement is such that the distance 12 of the additional mass 8 from the pivot axis 10—10 is greater than the distance 13 of the ball joint 14 from the pivot axis 10—10.

Furthermore, to increase the pivot angle of the additional mass 8, the distance 21 of the point of articulation 20 of the link 16 on the shift lever 6 is greater than the distance 22 of the point of articulation, i.e., joint pin 7, on the shift lever 6 for the kinematic connection of the latter to the manual shift lever. Finally, it is ensured that the shift lever 6 and jib 16 have the same pivoting direction, in that the distance 18 of the ball joint 14 from the rotation axis 11—11 is selected to be greater than the distance 19 between the pivot axis 10—10 and rotation axis 11—11.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A shift device for a gear change transmission of a motor vehicle, comprising a selector shaft (5) arranged rotatably and axially displaceably in a gear-shift housing (4) and having a shift lever (6) rotationally fixed relative to the said selector shaft (5) and kinematically connected to a manual shift lever; and an additional mass (8) acting on the shift lever (6) and increasing a mass moment of inertia of the selector shaft (5) such that force peaks of shift force measurable on the manual shift lever are reduced during individual gear-shift operations, the additional mass (8) being connected to the selector shaft (5) and arranged on a jib (15) mounted pivotably on a housing part (9) of the gear-shift housing (4) at a distance from a rotation axis (11—11) of the selector shaft (5), which jib (15) is transmission-connected to the shift lever (6) and a pivot-bearing axis (10—10) of the jib (15) being parallel to the rotation axis (11—11) of the selector shaft (5), the additional mass (8) being arranged at a distance (12>13) from the pivot axis (10—10) greater than a transmission connection (14) between the jib (15) and shift lever (6) and so that only the engagement movement is transmitted to the additional mass (8), wherein a link (16) is articulated at one link end on the shift lever (6) and at another link end on the jib (15).

2. The shift device according to claim 1, where ball joints (14, 17) comprise articulation of the link ends.

3. The shift device according to claim 1, where an articulation point (14) on the jib (15) is at a distance (18>19) from the rotation axis (11—11) of the selector shaft (5) greater than the pivot axis (10—10).

4. The shift device according to claim 3, where ball joints (14, 17) comprise articulation of the link ends.

5. The shift device according to claim 1, wherein an articulation point (20) on the shift lever (6) for articulation of the link (16) is at a distance (21>22) from the rotation axis (11—11) of the selector shaft (5) greater than the articulation point (7) on the shift lever (6) for the kinematic connection to the manual shift lever.

6. The shift device according to claim 5, where ball joints (14, 17) comprise articulation of the link ends.

7. The shift device according to claim 6, where an articulation point (14) on the jib (15) is at a distance (18>19) from the rotation axis (11—11) of the selector shaft (5) greater than the pivot axis (10—10).

* * * * *